(12) United States Patent
Choi (10) Patent No.: US 8,504,123 B1
(45) Date of Patent: Aug. 6, 2013

(54) TELEPHONE RINGING SIGNAL-BASED NOTIFICATION METHOD FOR MOBILE DEVICES

(75) Inventor: Yong Hoon Choi, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/465,443

(22) Filed: May 7, 2012

(51) Int. Cl.
*H04M 1/00* (2006.01)
*H04B 1/04* (2006.01)

(52) U.S. Cl.
USPC ........................................ 455/574; 455/127.5

(58) Field of Classification Search
USPC ................................ 455/574, 127.5
See application file for complete search history.

(56) References Cited

U.S. PATENT DOCUMENTS

| | | | |
|---|---|---|---|
| 5,635,897 A | 6/1997 | Kuo | |
| 6,618,580 B2 | 9/2003 | Parrott et al. | |
| 6,757,538 B1 | 6/2004 | Howe | |
| 7,546,131 B1 | 6/2009 | Sidi et al. | |
| 7,853,703 B1 | 12/2010 | McBarron et al. | |
| 8,036,367 B2 | 10/2011 | Baluja et al. | |
| 2007/0037610 A1 | 2/2007 | Logan | |
| 2011/0109472 A1 | 5/2011 | Spirakis et al. | |
| 2012/0309397 A1* | 12/2012 | Rao et al. ...................... | 455/437 |

OTHER PUBLICATIONS

How to modify the TCP/IP maximum retransmission timeout. Microsoft Support [online]. [retrieved on Jan. 17, 2012]. Retrieved from the Internet: <URL: http://support.microsoft.com/kb/170359>.
Android Cloud to Device Messaging Framework—Google Projects for Android [online]. [retrieved on Nov. 29, 2011]. Retrieved from the Internet: <URL: http://code.google.com/android/c2dm/>.
Configure Wake on Wireless LAN (WoWLAN) [online]. [retrieved Nov. 29, 2011]. Retrieved from the Internet: <URL: http://technet.microsoft.com/en-us/library/ee851581(WS.10,printer).aspx>.
Shih, E. et al. "Wake on Wireless: An Event Driven Energy Saving Strategy for Battery Operated Devices." MobiCom '02 Sep. 23-26, 2002, Atlanta, Georgia, USA.
Bahl, V. et al. "Wake on Wireless—a Case for Multi Radio Wireless LAN." Apr. 4, 2002. Powerpoint Presentation. Microsoft Research.

* cited by examiner

*Primary Examiner* — Temica M Beamer
*Assistant Examiner* — Joel Ajayi
(74) *Attorney, Agent, or Firm* — Dykema Gossett PLLC (57) ABSTRACT

A mobile communication device enables improved connectivity and power management. The device includes a first wireless network interface configured for connection to a first network and a second wireless network interface configured for connection to a second network. The first interface has an active mode of operation and a sleep mode. The device places the first interface in the sleep mode when not needed for communications. An external system such as a messaging server calls the device when it is unable to access the device through the first interface. The second network, which can be a cellular network, handles the call request and transmits a ringing signal to the second interface of the device. A notification handler, upon receipt of the ringing signal, wakes the first interface, permitting normal communications through the first interface. Power management logic can be more pro-active in placing the first interface into the sleep mode.

20 Claims, 3 Drawing Sheets

TELEPHONE RINGING SIGNAL-BASED NOTIFICATION METHOD FOR MOBILE DEVICES

TECHNICAL FIELD

This document relates to mobile communication devices.

BACKGROUND

Many portable digital devices have a wireless network interface, such as a Wi-Fi compatible interface, for data communications. In addition, in support of portability, many of these devices are also configured to operate using battery power. Often, however, such devices have power management mechanisms that place the wireless network interface in a so-called sleep mode when external communications through the interface are not required. Through the use of the sleep mode, power consumption can be reduced, thus improving battery life.

However, because the wireless network interface is in the sleep mode, the device cannot receive any communications (e.g., a push notification) through the wireless network interface. For example, when a Wi-Fi interface of a tablet computer is in the sleep mode, and is therefore inactive, an instant messenger application on the device cannot receive, through the Wi-Fi interface, a notification requesting a chatting session from an instant messaging server. The use of the sleep mode, while perhaps extending battery life, can limit, in some circumstances, the greatest possible use of the device.

Some devices have alternate communication mechanisms which do not suffer from the above problem. For example, in the context of 2G/3G/4G mobile network-equipped devices, it is known to provide a service where a persistent communication channel is maintained between the device and a messaging server. Notification messages from external services can be therefore delivered to the device over the persistent communication channel. However, in Wi-Fi only devices, such as ebook readers and tablet computers, this alternate mechanism (persistent communication channel) is unavailable and therefore such devices can miss important notifications when the device's Wi-Fi interface has been deactivated in order to save battery power.

SUMMARY

In an embodiment, a method for operating a mobile communication device, which includes a first wireless network interface configured for connection to a first network and a second wireless network interface configured for connection to a second network, includes a number of actions. One act involves placing the first wireless network interface in a sleep mode of operation that has a reduced level of power consumption compared to an active mode of operation of the first wireless network interface. The mobile communication device is unable to receive data messages from the first network through the first wireless network interface in the sleep mode of operation. The mobile communication device is able to receive data messages from the first network through the first wireless network interface in the active mode of operation. Another act involves generating a notification when an alerting message has been received by the second wireless network interface from the second network indicative of a request from an external computing system to change the mode of operation of the first wireless network interface to the active mode. A further act involves waking the first wireless network interface in response to the generated notification by changing the mode of operation from the sleep mode of operation to the active mode of operation, thereby enabling the mobile communication device to receive data messages from the first network through the first wireless network interface.

In another embodiment, a mobile communication device includes one or more processors, a display coupled to the one or more processors and a first wireless network interface coupled to the one or more processors. The first wireless network interface is configured for connection to a first network, and has an active mode of operation configured for the exchange of data messages between the mobile communication device and the first network through the first wireless network interface, and a sleep mode of operation wherein the mobile communication device is unable to exchange data messages with the first network through the first wireless network interface. The sleep mode has a reduced level of power consumption compared to the active mode of operation. The mobile communication device also includes a second wireless network interface coupled to the one or more processors and is configured for connection to a second network. The second wireless network interface is configured to generate a notification in response to receipt of an alerting message from the second network indicative of a request from an external computing system to change the mode of operation of the first wireless network interface to the active mode. The mobile communication device further includes a notification handler configured to wake the first wireless network interface in response to the generated notification by changing the mode of operation from the sleep mode to the active mode, thereby enabling exchange of data messages between the mobile communication device and the first network through the first wireless network interface.

In another embodiment, a method of operating a system with a server application configured for communications with a client application on a mobile communication device includes a number of actions. One act involves transmitting a data message from the server application destined for the client application on the mobile communication device through a first network. The mobile communication device includes a first wireless network interface for connection to the first network. Other acts involve determining when transmitting of the data message fails (or would result in a failure), and initiating, from the server application, a voice call through a second network to a directory number associated with the mobile communication device, in order to wake the first wireless network interface from a sleep mode of operation wherein the mobile communication device is unable to receive data messages from the first network through the first wireless network interface to an active mode of operation wherein the mobile communication device is enabled to receive data messages from the first network through the first wireless network interface. A further act involves re-transmitting the data message from the server application to the client application over the first network after initiating the voice call has been performed.

The foregoing and other aspects, features, details, utilities and advantages of the present teachings will be apparent from reading the following description and claims, and from reviewing the accompanying drawings.

DETAILED DESCRIPTION

Figure 1:
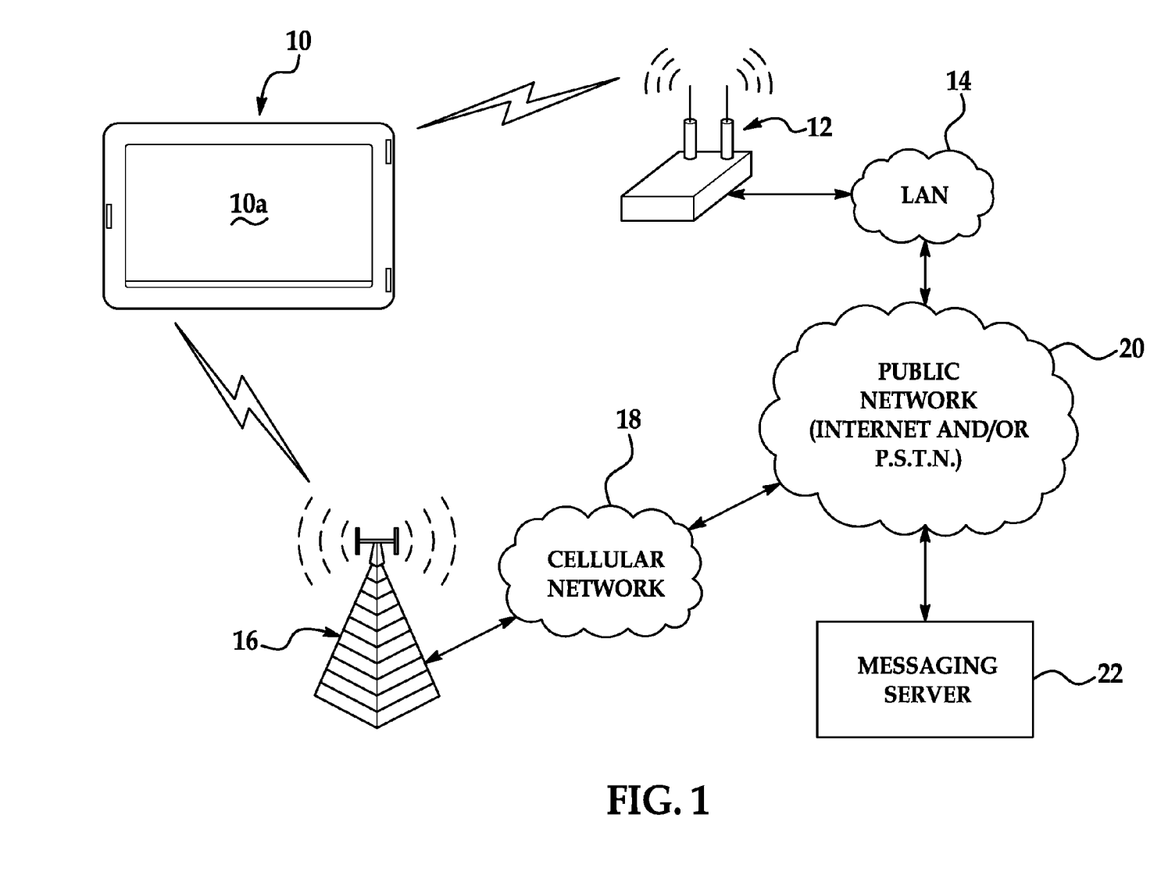
FIG. 1 is a diagrammatic view of an embodiment of a mobile communication device having a ringing-signal based notification to wake a wireless network interface that has been placed in a sleep mode.

Referring now to the drawings wherein like reference numerals are used to identify identical components in the various views, FIG. 1 illustrates a mobile communication device 10. In the illustrated embodiment, mobile communication device 10 includes a tablet computer having a touch-sensitive display 10a. It should be understood, however, that mobile communication device 10 may include any of a wide variety of devices configured for wireless communication with a cellular and/or short-range network (e.g., Wi-Fi), and through which mobile communication device 10 may maintain communication with the network despite changes in location of mobile communication device 10. For example, mobile communication device 10 may include, without limitation, ebook reader computers, gaming consoles, set-top boxes (STBs), GPS-based navigation devices, personal digital assistants (PDAs), notebook computers and cellular telephones, to name a few.

Mobile communication device 10 includes a first wireless network interface configured for connection, for example, by way of wireless access point 12, to a first network 14. First network 14 may include a local area network (LAN) 14, but could alternately include a wide area network or the like (e.g., in the case of a Wi-Fi hotspot). The first network 14 may in turn be connected to a network 20 in order to provide complete end-to-end communications for mobile communication device 10 with one or more external systems, as will be described in greater detail below. The network 20 may include a public switched telephone network (PSTN) and/or the public Internet.

Mobile communication device 10 further includes a second wireless network interface configured for connection, for example by way of base transceiver station 16, to a second network 18, which may include a cellular communications network. The second network 18 can be different than the first network 14, as in the illustrated embodiment. In the case where the second network 18 is a cellular network, it may further include a plurality of base transceiver stations (not shown) controlled by a base station controller (also not shown), as known in the art. The base station controller (or plural controllers) may be connected to a gateway mobile switching center (GMSC—not shown). The GMSC may in turn be connected to the network 20 in order to provide complete end-to-end voice and data communications capability between mobile communication device 10 and one or more external systems. One of ordinary skill in the art will recognize that variations are possible, particularly in light of the wide range of cellular communication technologies.

FIG. 1 further shows an example of a computing system that is external to mobile communication device 10, such as an instant messaging server 22.

Before proceeding to a detailed description of mobile communication device 10, however, a general overview of its operation in relation to the connected networks and the external system will first be set forth. The first wireless network interface of mobile communication device 10 includes at least an active mode of operation and a sleep mode of operation. When the first wireless network interface is in the sleep mode of operation, and is thus inactive, communications through the first wireless network interface cannot occur. For example, tablet computers or ebook readers typically only have access through Wi-Fi. Therefore, when external communications are not needed, the device processor places the Wi-Fi interface into a sleep mode, saving battery power. Accordingly, when an external system, like instant messaging server 22, attempts to send a notification for a chat request, the notification is never received by the instant messenger client application, due to the fact that the Wi-Fi connection is unavailable.

To address this situation, mobile communication device 10, in an embodiment, is equipped with a second wireless network interface, for example, a basic mobile telephony module for voice calling (see below for greater detail). The instant messaging server 22 is also modified, and is configured so that when an attempt to connect to the client application on mobile communication device 10 fails, the messaging application on instant messaging server 22 then initiates a voice call to mobile communication device 10, for example only, over network 20 and second network 18. The telephony module in mobile communication device 10 generates a ringing signal notification when a ringing signal is received, indicating a call establishment request from the network. Mobile communication device 10 also includes a notification handler, which, in response to the ringing signal notification, is configured to wake the first wireless network interface from the sleep mode. To wake the first wireless network interface from the sleep mode means at least to place the first wireless network interface in the active mode.

After this procedure to wake the first wireless network interface, the mode of operation is changed from the sleep mode to the active mode. The instant messenger server application on instant messaging server 22 can then re-attempt connection to mobile communication device 10 and re-transmit the data message to the client messaging application on the mobile communication device 10. In this example, the instant messenger application on mobile communication device 10 can therefore now handle notification messages flowing through the first wireless network interface (e.g., Wi-Fi). Through the foregoing, the trade-offs and limitations between power consumption, battery life and communications availability, as described in the Background, can be overcome.

Figure 2:
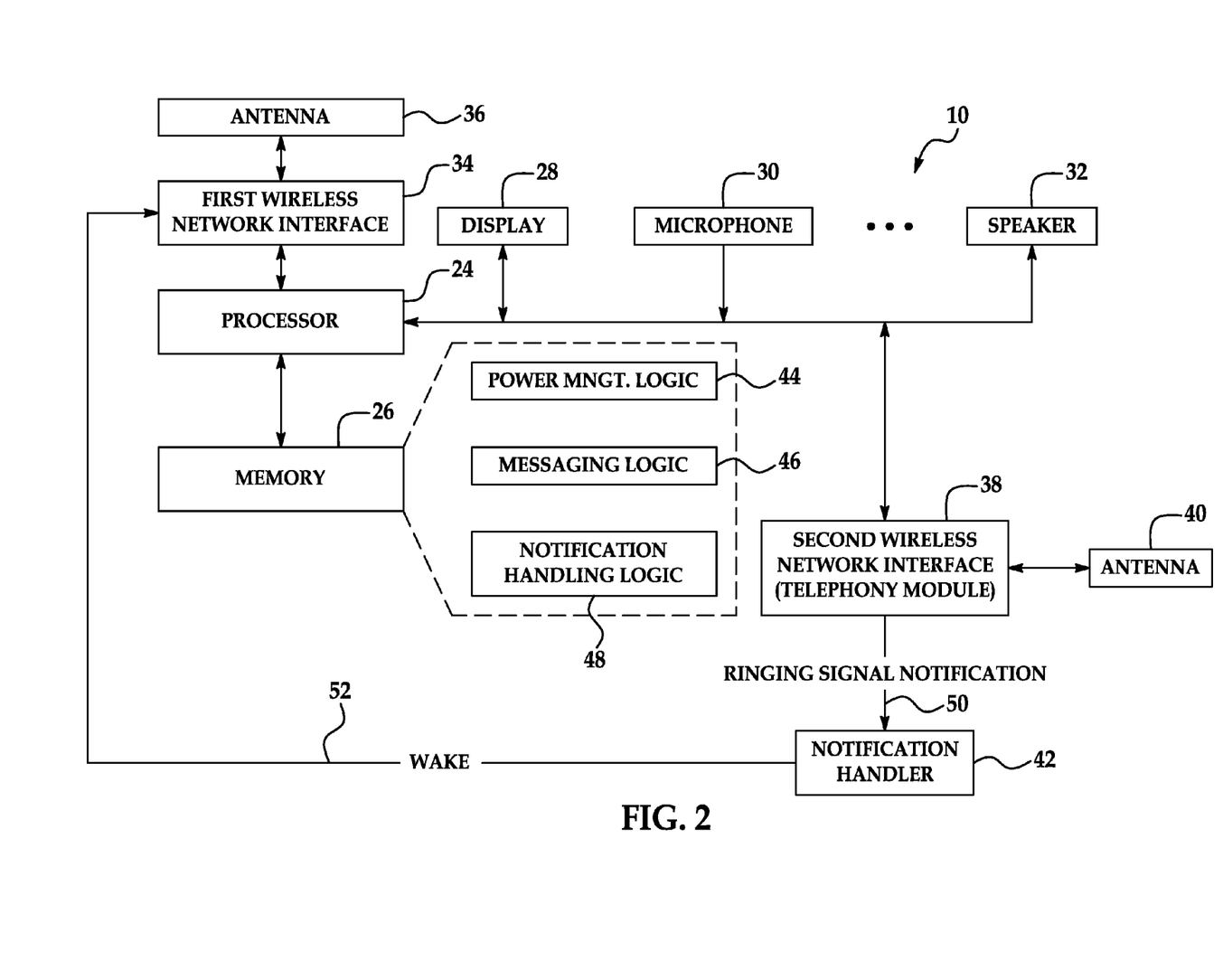
FIG. 2 is a block diagram showing, in greater detail, the mobile communication device of FIG. 1.

FIG. 2 is a block diagram showing, in greater detail, an embodiment of mobile communication device 10. Mobile communication device 10 may include one or more processors 24, a memory 26, a variety of input/output mechanisms such as a display 28, a microphone 30 and a speaker 32, a first wireless network interface 34 and its associated antenna 36, a second wireless network interface 38 and its associated antenna 40, and a notification handler 42. Although not illustrated, mobile communication device 10 may include further components, such as a re-chargeable battery, signal processing circuitry and the like.

Processor 24 is configured generally to control the overall operation of mobile communication device 10, including coordination and cooperation among and between the other components of mobile communication device 10. For instance, overall control may be achieved through execution by one or more processors 24 (only one shown) of a suitable mobile device operating system. In addition, mobile communication device 10 may include any number of application programs stored in memory 26 and configured for execution by one or more processors 24. For example only, one or more processors 24 may be configured for (i) power management via execution of power management logic 44 and (ii) instant messaging functionality via execution of a client application designated as messaging logic 46.

Processor 24 may include one or more programmable microprocessors or microcontrollers. In addition, processor 24 may include a central processing unit (CPU), memory (in addition to or such as the illustrated memory 26) and an input/output (I/O) interface through which processor 24 may receive a plurality of input signals including signals generated by microphone 14 and first wireless network interface 34 and second wireless network interface 38. Such I/O interface is also configured to generate a plurality of output signals including those used to control and/or provide data to display 28, speaker 32, and first wireless network interface 34 and second wireless network interface 38.

Memory 26 is provided for storage of data and instructions or code (i.e., software) for processor 24. Memory 26 may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM). Although illustrated as a separate component in the illustrated embodiment, it should be understood that memory 26 may be internal to processor 24.

Display 28 functions as an input/output device for the user of mobile communication device 10 and may include components known in the art. Display 28 may be, for example, a liquid crystal display or light emitting diode display or other technologies known in the art. Display 28 may function as only an output device with input received through other I/O devices such as a keyboard. Alternatively, display 28 may also function as an input device and may include a touch screen display including, for example, capacitive and resistive touch screen displays, or other technologies known in the art.

Microphone 30 is an acoustic to electric transducer that converts sound or mechanical vibration to electrical signals. Speaker 32 is an electric to acoustic transducer that generates sound in response to electrical signals indicative of audio communications. Microphone 30 and speaker 32 may also be components known in the art.

First wireless network interface 34 (and its associated antenna 36) is configured for establishing a connection between mobile communication device 10 and first network 14. First wireless network interface 34 may include a wireless network interface, for example, having a radio transceiver as known in the art. In an embodiment, first wireless network interface 34 may be configured for short-range wireless communication using short-range wireless technologies such as those that comply, for example only, with Wi-Fi (i.e., IEEE 802.11) or Bluetooth standards.

In addition, first wireless network interface 34 includes at least one active mode of operation and at least one sleep mode of operation. In the active mode, which has a first power consumption level, the full functionality of first wireless network interface 34 may be accessed by one or more processors 24. However, to reduce power consumption, the one or more processors 24 may place first wireless network interface 34 in the sleep mode, which reduces functionality but also reduces power consumption from the first power consumption level to a second power consumption level that is less than the first power consumption level. In an embodiment, the sleep mode effectively turns off operation of the interface, precluding communications entirely. In the sleep mode, mobile communication device 10 (e.g., through an instant messaging client application, as indicated by messaging logic 46) is unable to perform communications with external systems through first wireless network interface 34, due to its inactive state. In a further embodiment, however, first wireless network interface 34 may include multiple levels of the sleep mode. For example, first wireless network interface 34 may have a first sleep mode (i.e., a "shallow" sleep mode having partial functionality with reduced power consumption) and a second sleep mode (i.e., a "deep" sleep mode that effectively deactivates the interface but which provides greater reductions in power consumption than the reductions available in the "shallow" sleep mode).

With continued reference to FIG. 2, second wireless network interface 38 (and its associated antenna 40) is configured to establish a connection between mobile communication device 10 and second network 18 (e.g., the cellular communications network as shown in FIG. 1). Generally, second wireless network interface 38 may include a wireless network interface, for example, having a radio transceiver (i.e., using communication topologies including frequency, time and code division multiple access topologies, such as FDMA, TDMA, CDMA and the like) that is compatible with base transceiver station 16 (best shown in FIG. 1).

As described above, second network 18 may be cellular communications network capable of at least basic voice services. Such a cellular network may be an analog cellular network (i.e., 1G), or any of the subsequent iterations of digital cellular communications networks (i.e., 2G/3G/4G) capable of carrying digital voice and data. It warrants mentioning, however, that actual voice carrying capability is not strictly needed for constructed embodiments, as only the signaling aspects (ringing signal) of basic voice service is necessary. Accordingly, second wireless network interface 38 may include, in an embodiment, a basic mobile telephony module.

A basic mobile telephony module, as known in the art for voice communication capability, is relatively inexpensive in terms of price as well as in terms of power consumption. Moreover, operationally speaking, such a telephony module is reliable and stable since mobile telephone carriers have been providing an ever-expanding coverage area for voice calling through the use of digital voice technologies, such as those provided via 2G/3G/4G networks.

Second wireless network interface 38 may be configured to perform basic functions, such initialization, network registration of mobile communication device 10, location updating with the network, and the like, as well as handling the physical communications access (i.e., transmit, receive, control) with respect to second network 18, all in accordance with the particular cellular technology being used (e.g., GSM, CDMA, LTE). The second wireless network interface 38 may include components known in the art. Further, it should be understood that while second wireless network interface 38 is shown as a separate block, it may be integrated, in varying levels, with other blocks included in mobile communication device 10.

With continued reference to FIG. 2, second wireless network interface 38 is configured to produce a ringing signal notification 50. The ringing signal notification 50 indicates, when active (asserted/present) that a "ringing signal" has been received from second network 18, indicating that a call establishment request has been received from the network. The ringing signal notification 50 indicates that the directory number of the mobile subscriber, which has been previously associated with mobile communication device 10, has been dialed.

As noted above, only a particular aspect of the voice service is needed. In this regard, a user of mobile communication device 10 need only become a limited subscriber to the second network 18. Specifically, the user need only subscribe/associate the directory number and/or other unique device identification with the second network 18. The user/subscriber does not need to obtain actual voice communication capability (i.e., air time/minutes). While a cellular service carrier may require a one-time fee for subscribing in this limited manner, no ongoing or recurring charges for actual voice service (airtime) would be needed. This features results in a reduction in the ongoing cost of operation of mobile communication device 10.

Ringing Signal.

In landline telephone systems, the ringing signal is a physical, electrical signal applied by the central switching office across the telephone wiring pair that extends out to the subscriber's premise. However, in a cellular communications network, the ringing signal may take a different form, and may be referred to in the relevant standards by a different name. Accordingly, without limitation, a few examples will be set forth to aid in understanding.

In one embodiment, second wireless network interface 38 may be compliant with an analog cellular network. In this embodiment, second wireless network interface 38, after initialization and network registration, and while in an idle state, monitors various paging channels established between the mobile communication device and a counterpart base station. When second wireless network interface 38 recognizes a paging message containing its identification number, which can be the result of an inbound voice call, it responds to the base station in a control channel with an appropriate data message. The base station in turn instructs mobile communication device 10, in a return message, as to what voice channel to use in establishing the voice call. After second wireless network interface 38 re-tunes to the specified voice channel, the base station sends to mobile communication device 10 a data signal, which here corresponds to an alerting/ringing message or signal, in order to activate ringing at mobile communication device 10. Subsequent call processing/set-up need not occur, inasmuch as only the ringing signal needs to be recognized by second wireless network interface 38.

In another embodiment, second wireless network interface 38 may be compliant with a digital cellular network. The acts performed by this embodiment are similar to those described above. In this embodiment, second wireless network interface 38, after initialization and network registration, likewise monitors for a paging message from the base transceiver station. When second wireless network interface 38 recognizes a paging message containing its identification number (e.g., temporary mobile subscriber identification), which can be due to an inbound voice call, it responds to the base transceiver station with an appropriate data message. The base transceiver station in turn instructs mobile communication device 10, in a return message, as to what channel to use in establishing the voice call. After second wireless network interface 38 re-tunes to the specified channel, the base transceiver station sends mobile communication device 10 an alerting/ringing message, which here corresponds to the ringing signal, in order to activate ringing at mobile communication device 10. Subsequent call processing/set-up need not occur, inasmuch as only the ringing signal needs to be recognized by second wireless network interface 38. It should be appreciated that other acts may occur and/or have been omitted for clarity, such as authentication.

With continued reference to FIG. 2, notification handler 42 is configured to wake the first wireless network interface 34 from a sleep mode of operation in response to the ringing signal notification 50. In an embodiment, notification handler 42 may include a hardware circuit that is configured to respond to the ringing signal notification 50 and generate a corresponding wake signal 52 suitable for waking up the first wireless network interface 34.

In another embodiment, however, the notification handler 42 may be implemented in software. Mobile communication device 10 may therefore include notification handling logic 48 (shown enclosed in phantom-line format to indicate that it is an alternate embodiment). The notification handling logic 48 is stored in memory 26 and is configured for execution by one or more processors 24. The notification handling logic 48 is likewise configured, in response to the ringing signal notification 50, to wake first wireless network interface 34 from a sleep mode of operation. For example, notification handling logic 48 may respond to ringing signal notification 50 from second wireless network interface 38 by communicating this notification to the operating system, which in turn broadcasts the signal/notification to different software modules executing in the mobile communication device 10 (e.g., the power management logic 44, which can turn the first wireless network interface 34 back on, or directly to a hardware control module that is programmed to turn the first wireless network interface 34 back on).

In a further embodiment, instead of a mobile telephony module, the second wireless network interface 38 may take the form of a pager interface configured to receive a paging message. In this embodiment, the second wireless network interface 38 may include components, for example, a FLEX protocol compliant page message interface. The page message may in general include a character sequence (i.e., either numeric or alpha-numeric of digits). In this embodiment, the notification handler 42 is configured to process the received character sequence from the pager module (not shown) in substitution of the ringing signal notification, and determine whether the received characters match a predetermined character sequence. If so, notification handler 42 will generate wake signal 52, which operates to wake the first wireless network interface 34 from the sleep mode.

Device/Client Side Operation.

Figure 3:
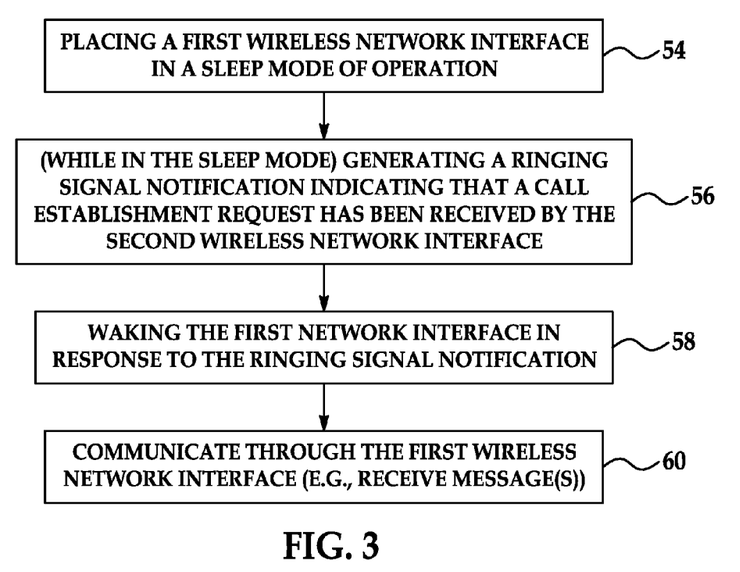
FIG. 3 is a flowchart showing, in an embodiment, acts for a ringing signal-based notification as performed in a mobile communication device, to wake the wireless network interface from the sleep mode.

FIG. 3 is a flowchart showing, in an embodiment, acts for ringing signal-based notification performed in a mobile communication device. In this regard, one or more processors 24 may be configured with programming instructions from a computer program (i.e., software) to perform the acts to be described below. The method begins in act 54.

In act 54, one or more processors 24, executing power management logic 44 stored in memory 26, determine that first wireless network interface 34 should be placed in a sleep mode of operation. Power management logic 44 may reflect known power management strategies and approaches. For example, when one or more processors 24 determine that communications through first wireless network interface 34 will not be needed, processor 24 may determine that first wireless network interface 34 should be placed in a sleep mode of operation. The method then proceeds to act 56.

In act 56, first wireless network interface 34 is in the sleep mode of operation and is thus inactive, as per act 54. Accordingly, mobile communication device 10 is unable to receive communications through first wireless network interface 34. When an external computing system, such as instant messaging server 22 (best shown in FIG. 1), attempts to connect to mobile communication device 10 to communicate with a client application (instant messaging client), for example to request a chatting session, instant messaging server 22 will ultimately determine, in accordance with its own programmed logic (see FIG. 4 and the accompanying text for the server side logic), that no connection is available and thus no communications to the messaging client can occur. Subsequently, instant messaging server 22 will place a voice call to mobile communication device 10 (see FIG. 4). Second wireless network interface 38, upon receiving the ringing signal from second network 18, will generate a corresponding ringing signal notification 50. The method then proceeds to act 58.

In act 58, the notification handler 42, in response to the ringing signal notification 50, generates wake signal 52, which is provided to first wireless network interface 34. Applying wake signal 52 to first wireless network interface 34 changes the mode of operation from the sleep mode to the active mode. In the active mode, first wireless network interface 34 is capable of connecting to first network 14. The method then proceeds to act 60.

In act 60, mobile communication device 10 communicates through first wireless network interface 34 in the active mode of operation. For example, an instant messaging server (e.g., instant messaging server 22 in FIG. 1) can now successfully connect to mobile communication device 10 and communicate with messaging client application, for example only, to deliver a notification of chatting request or other data messages.

Server Side Operation.

Figure 4:
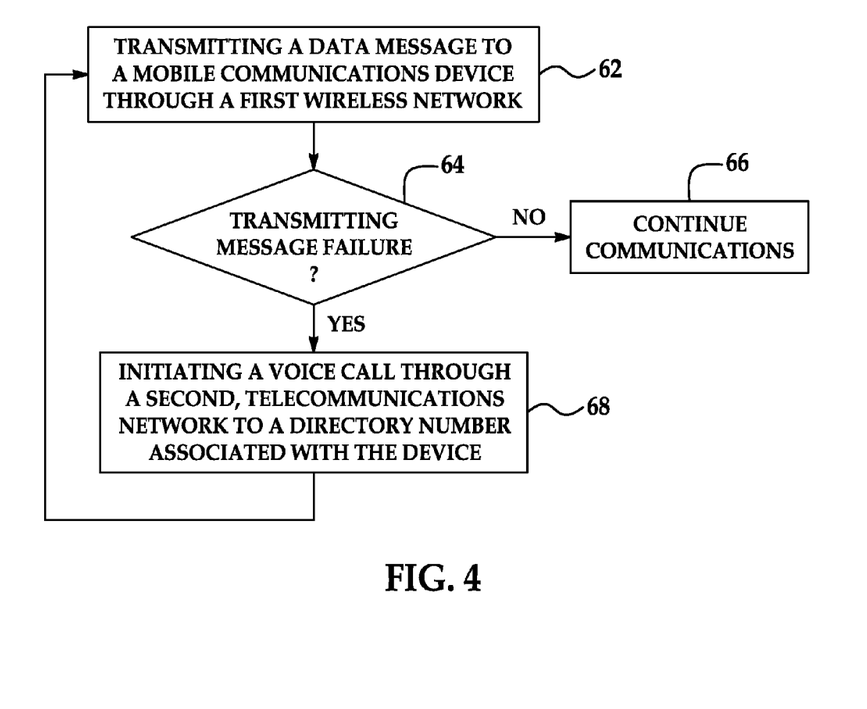
FIG. 4 is a flowchart showing, in an embodiment, acts for a ringing signal-based notification as initiated from an external server.

FIG. 4 is a flowchart showing, in an embodiment, acts for ringing signal notification to wake first wireless network interface in a client device, as initiated by an external computing system, such as external instant messaging server 22. This methodology may be embodied in software (sometimes referred to in this document as "wakeup logic") and stored in a memory of the server for execution by one or more processor associated with the server. The method begins in act 62.

In act 62, the external computing system (e.g., external messaging server, such as instant messaging server 22 in FIG. 1) transmits a data message to mobile communication device 10 destined for delivery through first wireless network interface 34 to the client application software running on the device. For example, mobile communication device 10 may have an Internet Protocol (IP) address, which is known in advance to the external server, in order to allow the server to direct a communication to the device. The method then proceeds to act 64.

In act 64, the external instant messaging server 22 is configured to determine when the attempt to transmit the data message to mobile communication device 10 (i.e., the client software on the device) fails. The external system may employ a number of known approaches to determine when the transmission attempt has failed. In one embodiment, the external system is configured to determine failure when it is unable to establish a connection. For example, the external system may employ a network protocol having a time-out function. For instance, the TCP/IP network protocol may be used, which features a suite of parameters that a user can specify to control the transmission and re-transmission attempts (including timing parameters) of a message to determine when to discontinue attempts (i.e., a connection failure). It should be understood that the external system/server may be configured with any one or more of other known approaches for determining when the transmission attempt to mobile communication device 10 has failed or would result in a failure. If the answer to act 64 is NO (transmission is a "success"), then the method branches to act 66. If, however, the answer to act 64 is YES, (transmission is "failure") then the method branches to act 68.

In act 66, first wireless network interface 34 is already in the active mode, and thus communications between the server application on the external computing system and the client application on the mobile communication device 10 can proceed normally.

In act 68, the wakeup logic has already determined that the transmission to the mobile communication device 10 has failed or would result in a failure. Accordingly, the external system/server continues to execute the wakeup logic in an effort to wake up the first wireless network interface of mobile communication device 10. To accomplish this function, the external system/server initiates a voice call to a directory number associated with mobile communication device 10. Depending on the particular connectivity that the external system/server has available, the voice call request may be routed through the PSTN and one or more cellular networks, as dictated by routing and switching network practices and availability.

The last leg of this call process involves second network 18 instituting a call setup process with mobile communication device 10 as the destination, using second wireless network interface 38. At least part of the call setup process will involve second network 18 sending a ringing signal, which may take the form of a message as described above, to mobile communication device 10, which is received via second wireless network interface 38. The second wireless network interface 38 will generate a ringing signal notification 50, which is provided to notification handler 42. The notification handler 42 will, in turn, produce wake signal 52. As described above, wake signal 52 is configured to wake first wireless network interface 34, placing it in an active mode of operation.

After the act of initiating the voice call has been completed, and first wireless network interface 34 has been changed to the active mode, control of the method returns to act 62, where the external system/server application is configured to re-transmit the data message to the client application on mobile communication device 10.

It should be understood that variations are possible. For example, the teachings set forth in this document can allow more aggressive power management strategies than previously possible. For example, in devices having multiple sleep levels (e.g., "shallow" and "deep" sleep modes, as described above), power management logic 44 can be configured to more frequently (and more pro-actively) maintain first wireless network interface 34 in a deep sleep mode, capturing greater power savings and extending battery life, owing to the capability of waking up first wireless network interface 34 using the ringing signal-based notification described in this document.

Embodiments that include a mobile telephony module in a mobile communication device exhibit a number of advantages. First, the basic mobile telephony module for voice calling is relatively inexpensive in both price and power consumption. These features result in low production cost and reduced power consumption. Second, the telephony module is reliable and stable since mobile carriers have significantly improved their coverage areas, especially for voice calling over data communications by way of 2G/3G/4G digital networks. Third, the cost of this feature to the user is low. Because usage of the telephony module only involves the signaling aspect of the voice service, and only a particular portion of the signaling, namely, the ringing signal, no airtime subscription is needed. Accordingly, since the user will not have to subscribe to a service providing for airtime, no recurring airtime charges will apply. Fourth, battery life can be extended. Because mobile devices incorporating a mobile telephony module as described in this document have a new capability of being remotely wakened, the device's power management logic can be more pro-active in placing its wireless interface into a sleep mode and/or into a deep sleep mode (e.g., the device can place the wireless interface—WiFi interface for example—in the sleep mode most of the time). Finally, Wi-Fi only mobile devices, when extended as described herein, can benefit from all of the above features.

It should be further understood that an article of manufacture in accordance with this disclosure includes a computer-readable storage medium having a computer program encoded thereon for implementing the ringing signal-based notification methods described herein. The computer program includes code to perform one or more of the methods disclosed herein.

While one or more particular embodiments have been shown and described, it will be understood by those of skill in the art that various changes and modifications can be made without departing from the spirit and scope of the present teachings.

What is claimed is:

1. A method for operating a mobile communication device having a first wireless network interface configured for connection to a first network and a second wireless network interface configured for connection to a second network, the method comprising:
    placing the first wireless network interface in a sleep mode of operation that has a reduced level of power consumption compared to an active mode of operation of the first wireless network interface wherein the mobile communication device is unable to receive data messages from the first network through the first wireless network interface in the sleep mode of operation and the mobile communication device is able to receive data messages from the first network through the first wireless network interface in the active mode of operation;
    generating a notification when an alerting message has been received by the second wireless network interface from the second network indicative of a request from an external computing system to change the mode of operation of the first wireless network interface to the active mode of operation; and,
    waking the first wireless network interface in response to the generated notification by changing the mode of operation from the sleep mode of operation to the active mode of operation, thereby enabling the mobile communication device to receive data messages from the first network through the first wireless network interface.

2. The method of claim 1 wherein the first wireless network interface comprises a transmitting and receiving apparatus compliant with a wireless communication technology selected from the group comprising Wi-Fi (IEEE 802.11 protocol) and Bluetooth.

3. The method of claim 1 wherein the second wireless network interface includes a cellular communications network interface and the alerting message includes a ringing signal.

4. The method of claim 3 further comprising:
    receiving the ringing signal by the second wireless network interface from the second network indicating a request to establish a voice call.

5. The method of claim 1 wherein the second wireless network interface comprises a pager interface and the alerting message includes a paging message, the method further comprising:
    receiving, through the pager interface, the paging message that includes a character sequence, and wherein generating the notification includes:
        determining when the received character sequence matches a predetermined character sequence indicative of the request from the external computing system to change the mode of operation of the first wireless network interface to the active mode.

6. The method of claim 1 further comprising:
    establishing a connection from the external computing system to the mobile communication device over the first network through the first wireless network interface; and
    receiving data messages from the external computing system through the established connection.

7. A mobile communication device, comprising:
    one or more processors;
    a display coupled to the one or more processors;
    a first wireless network interface coupled to the one or more processors and configured for connection to a first network, the first wireless network interface having an active mode of operation configured for the exchange of data messages between the mobile communication device and the first network through the first wireless network interface, and a sleep mode of operation wherein the mobile communication device is unable to exchange data messages with the first network through the first wireless network interface, the sleep mode having a reduced level of power consumption compared to the active mode of operation;
    a second wireless network interface coupled to the one or more processors and configured for connection to a second network, the second wireless network interface being configured to generate a notification in response to receipt of an alerting message from the second network indicating a request from an external computing system to change the mode of operation of the first wireless network interface to the active mode; and,
    a notification handler configured to wake the first wireless network interface in response to the generated notification by changing the mode of operation from the sleep mode to the active mode, thereby enabling exchange of data messages between the mobile communication device and the first network through the first wireless network interface.

8. The device of claim 7 wherein the sleep mode of the first wireless network interface includes a first sleep mode having a first power consumption level and a second sleep mode having a second power consumption level less than the first power consumption level, the mobile communication device further including:
    power management logic stored in a memory coupled to the one or more processors;
    wherein the one or more processors is configured to execute the power management logic to manage power usage in at least the first wireless network interface, the one or more processors being configured by the power management logic to place the first wireless network interface in the second sleep mode of operation.

9. The device of claim 7 wherein the first wireless network interface comprises a transmitting and receiving apparatus compliant with a wireless communication technology selected from the group comprising Wi-Fi (IEEE 802.11 protocol) and Bluetooth.

10. The device of claim 7 wherein the second wireless network interface comprises a mobile telephony module.

11. The device of claim 10 wherein the alerting message comprises a ringing signal, wherein the mobile telephony module is configured to recognize the ringing signal received from the second network and to generate the notification in response.

12. The device of claim 7 wherein the second wireless network interface comprises a pager interface and wherein the alerting message comprises a paging message including a character sequence, and wherein the notification handler is configured to wake the first wireless network interface when the received character sequence matches a predetermined character sequence.

13. The device of claim 7 wherein the alerting message includes a ringing signal, the notification handler including a hardware circuit responsive to the ringing signal.

14. The device of claim 7 wherein the notification handler comprises notification handling logic stored in a memory coupled to the one or more processors, the one or more processors being configured to execute the notification handling logic to wake the first wireless network interface in response to the notification.

15. The device of claim 14 further comprising messaging logic stored in the memory and configured for execution on the one or more processors, the messaging logic being configured to receive data messages through the first wireless network interface after the first wireless network interface has been placed in the active mode of operation.

16. A method of operating a computing system with a server application configured for communications with a client application on a mobile communication device, the method comprising:
   transmitting a data message from the server application destined for the client application on the mobile communication device through a first network wherein the mobile communication device includes a first wireless network interface for connection to the first network;
   determining when transmitting of the data message fails or would result in a failure;
   initiating, from the server application, a voice call through a second network to a directory number associated with the mobile communication device, in order to wake the first wireless network interface from a sleep mode of operation wherein the mobile communication device is unable to receive data messages from the first network through the first wireless network interface to an active mode of operation wherein the mobile communication device is enabled to receive data messages from the first network through the first wireless network interface; and
   re-transmitting the data message from the server application to the client application over the first network after initiating the voice call has been performed.

17. The method of claim 16 wherein determining when transmitting of the data message fails or would result in a failure includes:
   determining that a request from the server application for a connection through the first network to the mobile communication device was unsuccessful.

18. The method of claim 17 wherein determining that the request for a connection was unsuccessful is performed using a network protocol having timer functionality.

19. The method of claim 18 further including defining the network protocol to include at least a TCP/IP protocol.

20. The method of claim 16 wherein the acts of (i) transmitting, (ii) determining, (iii) initiating, and (iv) re-transmitting are performed by one or more processors executing wakeup logic stored in a memory of the computing system.

* * * * *